(12) United States Patent
Hoffman et al.

(10) Patent No.: US 10,983,877 B1
(45) Date of Patent: Apr. 20, 2021

(54) BACKUP MONITORING WITH AUTOMATIC VERIFICATION

(71) Applicant: eFolder Inc., Denver, CO (US)

(72) Inventors: Kevin John Hoffman, Denver, CO (US); Aditya Sawhney, Denver, CO (US); Nikolay Stanislavovich Semchenkov, Smolensk (RU); Konstantin Sergeevich Germanov, Moscow (RU); Dmitry Valerevich Stepanov, Smolensk (RU)

(73) Assignee: eFolder Inc., Denver, CO (US)

( * ) Notice: Subject to any disclaimer, the term of this patent is extended or adjusted under 35 U.S.C. 154(b) by 0 days.

(21) Appl. No.: 16/667,574

(22) Filed: Oct. 29, 2019

(51) Int. Cl.
| | |
|---|---|
| *G06F 11/00* | (2006.01) |
| *G06F 11/14* | (2006.01) |
| *G06F 11/07* | (2006.01) |
| *G06F 11/30* | (2006.01) |
| *G06F 9/455* | (2018.01) |

(52) U.S. Cl.
CPC ...... *G06F 11/1484* (2013.01); *G06F 9/45558* (2013.01); *G06F 11/0757* (2013.01); *G06F 11/1461* (2013.01); *G06F 11/1464* (2013.01); *G06F 11/1469* (2013.01); *G06F 11/3034* (2013.01); *G06F 2009/45591* (2013.01)

(58) Field of Classification Search
CPC ............. G06F 11/1484; G06F 11/0757; G06F 11/1464; G06F 11/1461; G06F 11/1469; G06F 9/45558; G06F 2009/45591
See application file for complete search history.

(56) References Cited

U.S. PATENT DOCUMENTS

| | | | | |
|---|---|---|---|---|
| 8,966,318 B1* | 2/2015 | Shah | ................... | G06F 11/3664 714/28 |
| 9,032,414 B1* | 5/2015 | Dalal | ........................ | G06F 9/50 711/162 |
| 10,204,019 B1* | 2/2019 | Talley | ................. | G06F 11/2294 |
| 2011/0087874 A1* | 4/2011 | Timashev | ........... | G06F 11/1446 713/100 |
| 2015/0347242 A1* | 12/2015 | Martos | ................... | G06F 11/203 714/19 |
| 2018/0285200 A1* | 10/2018 | Inbaraj | ..................... | G06F 9/452 |
| 2018/0329788 A1* | 11/2018 | Blum | ................... | G06F 11/3696 |

* cited by examiner

*Primary Examiner* — Philip Guyton
(74) *Attorney, Agent, or Firm* — Invoke

(57) ABSTRACT

In an embodiment, automatic verification of a system backup operation is provided. This verification is achieved by copying executable files to a writeable file system representing a backup recovery point and configuring an operating system within the writeable file system to execute a particular service upon startup of the operating system. Moreover, a validation virtual machine (VM) associated with a backup recovery point is launched from the writeable file system and a first and second validation operation are performed by the validation VM. Results of the first validation operation are used to select the second validation operation, and the validation VM is determined to have completed successfully based on the results of the second validation operation. In one embodiment, a repair operation may be performed, based on the first set of results, to repair the operating system of the computing device and/or backup data of the computing device.

25 Claims, 5 Drawing Sheets

US 10,983,877 B1

BACKUP MONITORING WITH AUTOMATIC VERIFICATION

TECHNICAL FIELD

The disclosure generally relates to backing up data systems, and more particularly to automatically verifying that backup data is reliable and available to be restored.

BACKGROUND

Many conventional backup techniques include a monitoring function that attempts to determine whether the backup data is usable. The monitoring function tries to check on the health and/or state of the backup data using a series of screenshots. The screenshots of a display screen are taken once each of a series of virtual machines has been started from the backup data corresponding to specific restore points.

In an example, a system initiates a monitoring function according to a schedule (e.g., once per day, hourly) or in response to a triggering event (e.g., in response to the creation of a backup, in response to a user command). The monitoring function initiates a virtual machine from a point-in-time snapshot of the data to be backed-up ("a restore point"). Once the system determines that the virtual machine has been started successfully, the system takes a screenshot of the boot screen for the virtual machine. The system may take the screenshot using a hypervisor or some other control mechanism. If the system is not able to start, the screenshot creation process fails and the backup data is marked as unusable or erroneous.

OVERVIEW

One or more embodiments automatically verify the integrity of backup data created by at least one system backup operation. This verification configures an operating system within a writeable file system to execute a particular service upon startup of the operating system. The writeable file system may be mounted prior to copying the executable file and a registry may be mounted prior to configuring the operating system. The service launches a validation virtual machine (VM) associated with a backup recovery point from the writeable file system and performs a series of validation operations.

Examples of validation operations that may be performed by the validation VM include a user-provided executable file, a heartbeat check, a volume shadow copy service (VSS) check, a disk integrity check, a database integrity check, a mail server integrity check, and a domain controller integrity check.

Results from an initial validation operation are used to select a follow-up validation operation. The results of the follow-up validation operation are used to determine whether the validation VM completed successfully.

In one or more embodiments, progress of the validation VM may be monitored using an overall timeout function. In addition, progress of the initial and any follow-up validation operations may be monitored using respective timeout functions. In these embodiments, a length of each timeout is configured specifically for its respective validation operation. Moreover, the length of any subsequent timeouts may be partially based on previously performed validation operations.

One or more embodiments execute repair operations prior to determining whether the validation VM completed successfully. As an example, an initial validation operation, as described above, may generate a set of results corresponding to an erroneous configuration. The system may execute a repair operation by issuing a command to modify the erroneous configuration.

Details of particular embodiments are provided with respect to the various drawings and the descriptions below. Other enhancements, features, details, and/or advantages of the particular embodiments may be ascertainable by those of skill in the art upon reading the present descriptions and viewing the drawings.

Also, the particular embodiments described herein may be implemented in any computing system environment known in the art, which may include one or more processors and a computer-readable medium configured to store logic, the logic being implemented with and/or executable by the one or more processors to cause the one or more processors to perform operations specified by the logic.

BRIEF DESCRIPTION OF THE DRAWINGS

Reference symbols in the various drawings that have the same number indicate like elements.

DETAILED DESCRIPTION

In the following descriptions, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. VALIDATING BACKUP DATA
3. MISCELLANEOUS; EXTENSIONS
4. HARDWARE OVERVIEW
5. COMPUTER NETWORKS AND CLOUD NETWORKS

1. General Overview

The descriptions presented herein relay sufficient information to enable a person having ordinary skill in the art to make and use the present invention and are provided in the context and requirements of particular embodiments of the present invention.

It is also noted that various modifications to the disclosed embodiments will be readily apparent to a person having ordinary skill in the art and the general principles defined herein may be applied to other embodiments and applications without departing from the spirit and scope of the present invention. Thus, the present invention is not intended to be limited to the embodiments shown and described herein, but is to be accorded the widest scope consistent with the principles and features disclosed herein.

Also, unless otherwise specifically defined herein, all terms are to be given their broadest possible interpretation including meanings implied from the specification as well as meanings understood by a person having ordinary skill in the art and/or as defined in dictionaries, treatises, etc.

Moreover, the term "about" when used herein to modify a value indicates a range that includes the value and less and greater than the value within a reasonable range. In the absence of any other indication, this reasonable range is plus and minus 10% of the value. For example, "about 10 milliseconds" indicates 10 ms±1 ms, such that the range includes all values in a range including 9 ms up to and including 11 ms.

In addition, the term "comprise" indicates an inclusive list of those elements specifically described without exclusion of any other elements. For example, "a list comprises red and green" indicates that the list includes, but is not limited to, red and green. Therefore, the list may also include other colors not specifically described.

Figure 1:
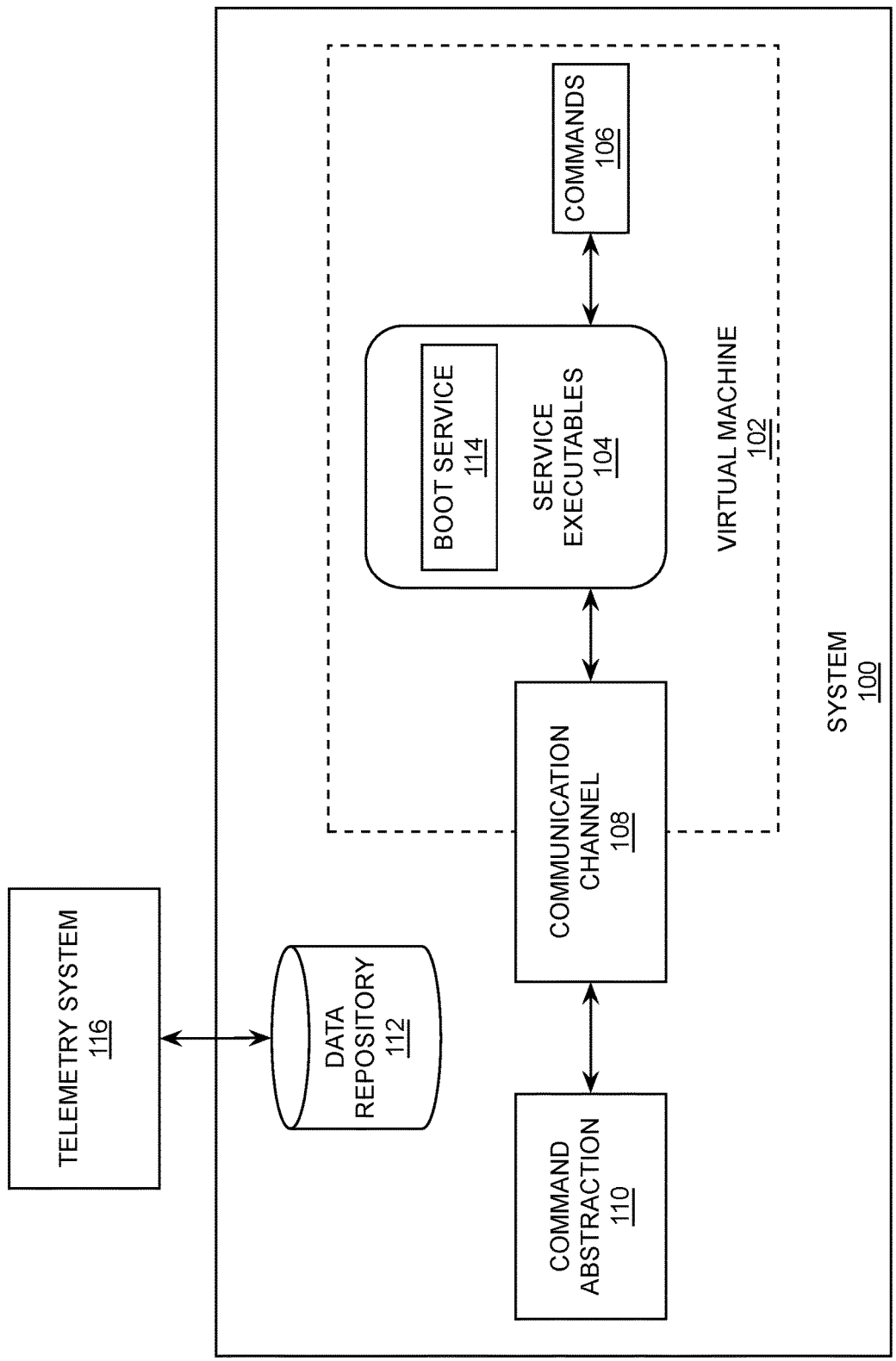
FIG. 1 is a simplified block diagram of an example system for automatic verification of a backup operation.

FIG. 1 is a simplified block diagram of an example system 100 for automatic verification of a backup operation for a reference computing system, comprising one or more computing devices (not shown). The system 100 may include one or more processors (not shown) and a data repository 112 for storing data. In one or more approaches, the system 100 may be any type of device that is capable of hosting a virtual machine (VM) 102, such as a host device, an appliance device, an application specific hardware device, etc. In one embodiment, the system 100 may be configured to provide a sandbox environment that does not affect or change the software, data, settings, and configurations of the reference computing system, for example, through use of the Quick EMUlator (QEMU).

The system 100 is configured to initiate and manage the VM 102 for verifying consistency of a backup recovery point and integrity of backup data for a reference computing system or device (not shown), which may be local to or remote from the system 100. Regardless of the location of the reference system, the system 100 is configured to be in electrical communication with the reference system and/or to send and receive information to/from the reference system or some intermediary device via wired and/or wireless communication channels. The backup recovery point for the reference system is managed by the system 100.

The VM 102 is started on top of data in the data repository 112 associated with a given recovery point that represents data on the reference system, e.g., customer data, target data, etc. Once the VM 102 is started, a series of validation operations may be generated using a command abstraction module 110 to be performed by the VM 102. These validation operations are configured to ensure integrity of the backup data and consistency of the backup recovery point for the reference system.

In one embodiment, one or more service executables 104 (e.g., *.exe files, *.ps1 files) may be injected into the VM 102. The service executables 104 may be used to execute commands 106 inside the VM 102 that are selected and sent by the system 100. These service executables 104 may have many different functions, such as preparing the VM 102 and/or reference system for verifying the backup recovery point, providing interface(s) between different functionalities, reporting results, performing validation operations, etc. In one approach, the service executables 104 may determine whether the VM 102 and/or reference system are healthy (functioning properly) or not based on results reported back to the system 100 via one or more communication channels 108. Health of the VM 102 and/or reference system may be indicative of the integrity of the backup data.

In an example, the service executables may comprise Windows services that are configured specifically for the reference system, the backup recovery point data, etc. The service executables may comprise Windows services available to use on standard data storage schemas.

The service executables 104 include at least one executable file (boot service 114) that is injected on the P2V stage of the launching process for the VM 102. In an example, a read-only backup recovery point in the data repository 112 that includes a file system may be cloned into a copy-on-write snapshot (e.g., using ZFS) and then mounted in a read/write mode using the NTFS-3G Library, or some other available library set, as a local block device on the system 100 hosting the backup recovery point data. The VM 102 operates on this file system. The system 100, in this example, may have Linux installed and operating thereon (e.g., Ubuntu Linux). Because the file system is mounted in read/write mode on a copy-on-write snapshot, contents of the file system may be modified before the VM 102 initiates or starts. In order to inject the boot service 114 from the service executables 104, the boot service 114 may be copied to the file system in an appropriate folder (e.g., Windows/System32 folder).

After the boot service 114 is copied to the file system, a registry (e.g., the Windows registry) may be mounted, and then modified in order to configure a service provided by the boot service 114 to start upon starting the VM 102 (e.g., at boot-up). In one example, the libhivex Linux tool (http://libguestfs.org/hivex.3.html) may be used to modify the registry. After such modification, the registry and/or the writeable file system may be unmounted.

The location of the registry may be determined based on information that is obtained from a backup agent executing on the reference system and/or on system 100 in an approach. Other methods of locating the registry may also be utilized, based on the type of operating system and/or previous experience with the reference system.

According to one approach, boot service 114 may be a proprietary service configured to be executed inside of the VM 102. The boot service 114 coordinates execution of the commands 106 within the VM 102. The boot service 114 also returns results of execution of the commands 106 back to the system 100.

According to one example, boot service 114 may be a standard Windows service running or executing inside of the VM 102. The boot service 114 is started during a Windows boot process due to a P2V stage registry configuration. Because the reference system is virtualized on the VM 102, communication channel(s) 108 are established between a guest (VM 102) and a host (system 100) in order to obtain results of commands 106 (e.g., a plurality of validation operations or checks) that are executed by the VM 102. These communication channel(s) provide bidirectional interaction between the guest and host systems.

In one example, a Windows COM-port may be utilized to establish a simple communication channel 108 between the VM 102 and the system 100. The command abstraction module 110 may provide instructions or commands through the Windows COM-port, which are read by the boot service 114 or some other service executable 104 for execution as commands 106. After execution of the commands 106, the boot service 114 or some other service executable 104 writes command results to the Windows COM-port, which are received by the command abstraction module 110. This is a simple method of communication that is supported by modern, conventional, and very old Windows versions.

According to one example, on the VM 102, COM-port may be represented or virtualized using a serial interface, e.g., provided by QEMU or some other available hardware virtualization serial emulator. The hardware virtualization of the system 100 may be able to support multiple virtualization platforms or hypervisors, or may host a proprietary virtualization platform or hypervisor specific to operating system or other properties of the reference system.

In one approach, the command abstraction module 110 may comprise a monitor process (e.g., a Python program or library) which provides an abstraction for running commands 106 inside the VM 102. The command abstraction 110 sends commands to the serial console and reads the results of execution of the commands 106 from the serial console. The command abstraction module 110 may be configured to manage one or more timeouts associated with execution of the commands 106, as described in more detail below.

In one embodiment, a telemetry system 116 is configured to collect and analyze statistics and/or data from execution of the various validation operations and/or checks using the VM 102 in system 100. The telemetry system 116 may be in communication with the system 100 and/or the data repository 112 of the system 100. The telemetry system 116 may be in communication with one or more additional systems performing validation of backup data, to build a database that may be used to determine and refine validation procedures based on a collectively learned experience across all systems monitored by the telemetry system 116.

In one or more embodiments, the data repository 112 may be included in the system 100 for storing commands, results from execution of the commands 106, and/or the service executables 104. The data repository 112 may include any type of storage unit and/or device (e.g., a file system, database, collection of tables, or any other storage mechanism) for storing data, including data originating from the reference system sent via a backup agent. Further, the data repository 112 may include multiple different storage units and/or devices. The multiple different storage units and/or devices may or may not be of the same type or located at the same physical site. Further, the data repository 112 may be implemented or may execute on the same computing system as system 100. Alternatively or additionally, the data repository 112 may be implemented or executed on a computing system separate from system 100. The data repository 112 may be communicatively coupled to system 100 and/or the telemetry system 116 via a direct connection, via a wireless connection, via a network, or some other connection that would be apparent to one of ordinary skill in the art.

In an embodiment, the data repository 112 stores, for transfer to the VM 102, the service executables 104, validation operations, pre-check conditions for execution of various validation operations, system configuration-specific details, the boot service 114, the commands 106, etc. The pre-check conditions may include instructions capable of determining whether the VM 102 and/or the system 100 is in condition for execution of a related validation operation. For example, a pre-check condition may determine whether the VM 102 has on its file system a certain SQL database installed and configured prior to running a validation operation that will check the integrity of the on-disk data structures specific to that type of SQL database. In another example, a pre-check condition may determine whether the VM 102 is acting as a Windows domain controller, prior to running domain controller health checks within the VM 102.

The system configuration-specific details may include information that is specific to at least one type of system. For example, for a Windows-based environment, one type of registry may be used that is located at a particular location; however, for a Linux-based system, a different type of registry may be used that is located in a different place. This information may be stored to the data repository 112 for transfer to the VM 102 when it would be useful for making more informed decisions on certain types of systems. Some example validation operations include, but are not limited to, a heartbeat check, a volume shadow copy service (VSS) check, a disk integrity check, a database integrity check, a mail server integrity check, and a domain controller integrity check.

In one embodiment, a heartbeat check may be a first step in validating backup data for a reference system, and acts to verify that one or more service executables have started successfully upon starting of the VM. The heartbeat check periodically sends an "echo" command to the one or more service executables. If the echo command executes successfully, the heartbeat check determines that the one or more service executables are running and that the VM was booted up successfully. The heartbeat check is the simplest validation check and may be used as a bare minimum to check data integrity. However, the heartbeat check may be used to confirm that the VM has booted, thereby eliminating false positives that exist with current approaches that rely solely on screenshot verification.

In an embodiment, a VSS check verifies that the VSS service in the VM and/or the reference system, which is critical for Windows backups to work correctly in a Windows-based infrastructure, has been started successfully and can take snapshots. Other critical services may be checked using other validation checks directed toward ensuring that the service has started with boot-up of the VM.

A disk integrity check, in various embodiments, may include execution of the "chkdsk" Windows command for every disk and virtual disk (and for each disk volume within each disk) available in the file system virtualized by the VM and/or in the reference system. In one embodiment, for each available disk volume within the file system virtualized by the VM, a Windows VSS snapshot is taken, with subsequent snapshot attempts being performed until the VSS snapshot is successfully formed. Meanwhile, the VM is starting services after booting. Thereafter, the VSS snapshot is mounted for read/write capability, and then chkdsk is run over the VSS snapshot, rather than directly on the volume itself. If the disk integrity check does not produce any errors, the disk integrity check determines that data of the file system is determined to not be corrupted in the backup recovery point.

A database integrity check is performed to verify the health of database servers in the file system of the VM and/or the reference system. Any type of database server may be checked using a database integrity check, such as database servers that utilize structured query language (SQL), Microsoft SQL (MSSQL), key-value databases such as MongoDB, etc. SQL database servers are a common part of Windows-based infrastructures. Different databases exist that serve different purposes: web services, informational services, organizational services, etc. Moreover, specific versions of MSSQL may be checked independently using different database integrity checks, including, but not limited to, a MSSQL full database integrity check which uses a "DBCC CHECKDB" SQL command and utilizes specific database credentials to run, and a MSSQL granular recovery check which parses the internal database structures on disk in order to verify that the database is not corrupted.

In an embodiment, a mail server integrity check is configured to determine the health of one or more mail servers of the VM and/or the reference system. Any mail server product may be checked, such as a MSExchange server, a post office protocol 3 (POP3) mail server, an Internet message access protocol (IMAP) mail server, a simple mail transfer protocol (SMTP) mail server, etc. MSExchange is a popular mail server for handling email services in a Windows-based infrastructure.

In specific embodiments, multiple levels of mail server verification may be supported, including, but not limited to, full mail server database integrity checks and granular mail server database integrity checks. Using MSExchange as an example mail server, a MSExchange full database integrity check uses a command-line tool to manage MSExchange databases, such as "eseutil." The mail server integrity check runs the command and checks the return code and output to verify that there are no errors. Again using MSExchange as an example mail server, a MSExchange granular recovery check parses the MSExchange database on a file-level and validates consistency of the MSExchange database internal structures.

A domain controller integrity check is configured to confirm that the domain controller installed in the reference system is in a healthy state in one or more embodiments. The Active Directory domain controller is typically a central and critical part of a Windows-based infrastructure. In a specific embodiment, a standard command-line tool, "dcdiag," may be used to perform the validation on the domain controller. The domain controller integrity check checks the return code and output of the dcdiag command in order to verify that there are no errors reported for the related domain controller.

Additional user-provided integrity checks may also be incorporated into the plurality of validation operations 204. These user-provided integrity checks may utilize a pluggable script which is injected into the validation VM and gets executed as one of the validation operation 204 in the sequence. This provides a user with the flexibility to provide their own custom checks. Moreover, by supporting pluggability of verification scripts that run on the reference system being virtualized, robust and comprehensive verification is provided to users that is purpose-built for individual protected reference systems and not just one verification script generally provided for all protected systems.

The system 100 may include one or more graphical user interfaces (GUIs) for implementing various functions, features, processes, operations, etc. These GUIs may be presented on a variety of electronic devices including, but not limited to, web browsers, laptop computers, desktop computers, computer terminals, television systems, tablet computers, smartphones, etc. One or more of these electronic devices may include a touch-sensitive surface and/or display.

2. Validating Backup Data

Figure 2:
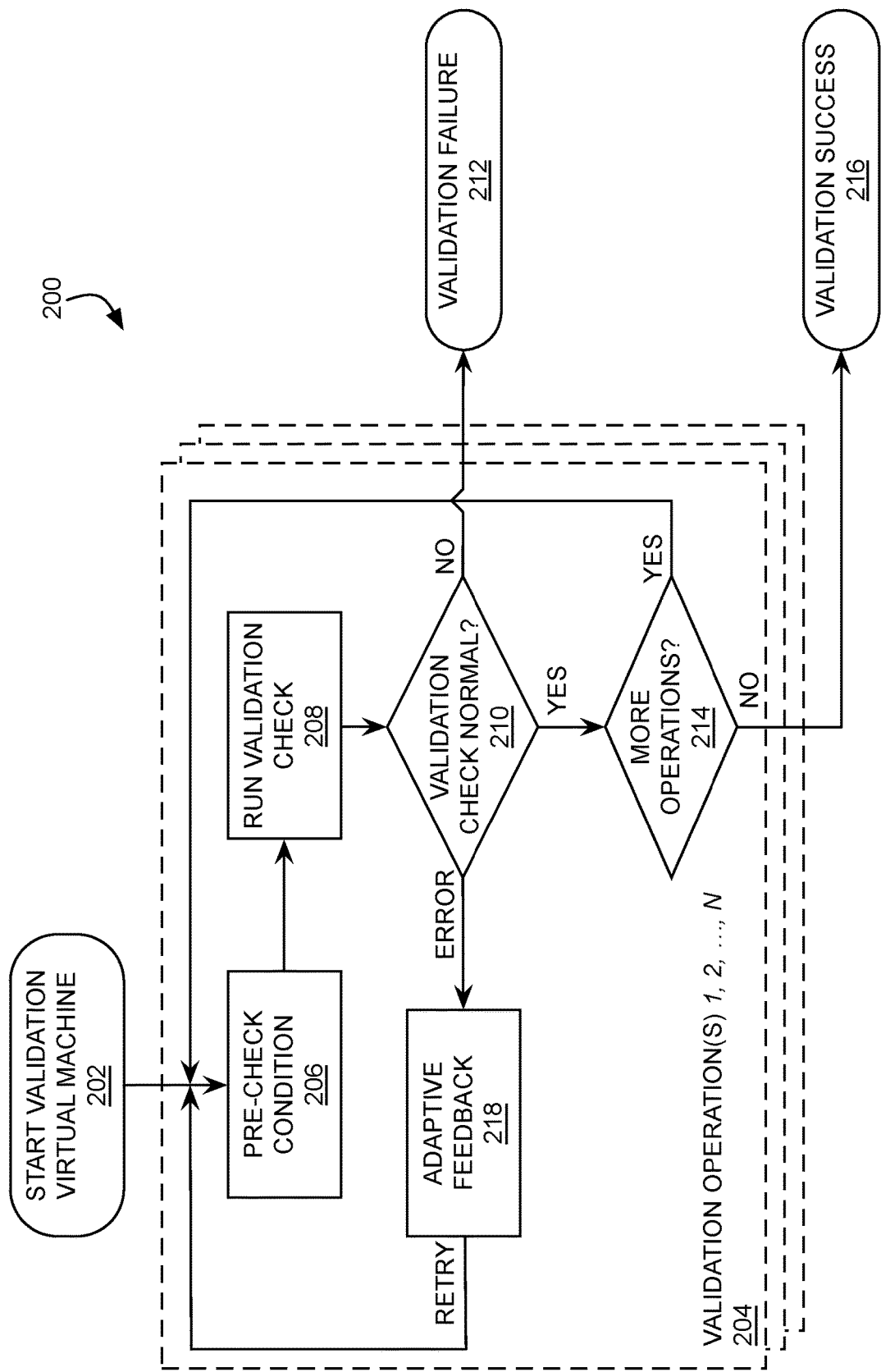
FIG. 2 illustrates a method for validating backup data according to one or more embodiments.

FIG. 2 illustrates a method 200 for validating backup data according to one or more embodiments. One or more operations illustrated in FIG. 2 may be modified, rearranged, or omitted all together. Accordingly, the particular sequence of operations illustrated in FIG. 2 should not be construed as limiting the scope of one or more embodiments. Method 200 provides a foundation for executing a number of validation operations or checks to determine the health of a reference system, backup recovery point, and/or VM.

In one approach, the general stability of the system may be verified using careful timeout management. In this approach, each validation operation is associated with its own timeout. With individual timeouts for each validation operation, flexible default times may be used for each timeout that are based on an operating system type for the reference system and/or VM, along with a size of the data for the reference system. In a further embodiment, an overall timeout may be used for the execution of all validation operations.

In an embodiment, a system starts a validation VM on a writeable file system (Operation 202). The system may start the validation VM via a hypervisor or some other virtualization platform using known techniques. The validation VM is configured to determine the health of the VM and/or the underlying reference system for which a backup recovery point is established.

The VM executes validation operations 204, numbered 1, 2, . . . , N, to check on different aspects, characteristics, and/or features of the reference system. The VM or some other process establishes a sequence for execution of the plurality of validation operations 204, in order to control the order of execution of the validation operations 204. This sequence may execute simpler operations before more complex operations, to conserve resources and reduce the testing time should a simpler operation fail early in the process. Other methods of ordering the validation operations 204 may be used, including an intelligent ordering that runs operations that test the overall system's health prior to running operations to check individual components or portions of the system.

The system verifies one or more pre-check conditions prior to executing any validation operation 204 which is associated with such pre-check conditions, in one approach, to determine whether it is appropriate to execute the validation operations 204 (Operation 206). The pre-check conditions are dictated by the particular validation operation 204 for which they are verified, and may change based on when the particular validation operation 204 is executed, e.g., first, last, after or before some other validation operation, etc. Verifying a pre-check condition may include determining that a system or device is in a particular state (e.g., booted up, running, stable, etc.), determining whether a resource is available for processing or executing the validation operation 204, ensuring that some other operation or process has finished prior to starting the validation operation 204, etc.

If no pre-check conditions are present to run or have already been completed, then the VM runs the validation check (Operation 208), with the particular validation check that is run relating to the specific validation operation 204.

Method 200 provides a foundation for running a number of different types of validation checks. The validation checks may be basic having simple outcomes, much more advanced, application-level validation checks, or anywhere in between.

The VM, or some other component of the system (e.g., command abstraction module) analyzes results of the validation check to determine whether the validation check executed normally (Operation 210). The VM, or other component of the system, determines that the validation check 208 executed normally in response to receiving results that are expected to be received when the system is operating correctly. For example, in response to a heartbeat check, the system expects to receive an echo response back from the VM each time it sends the prompt. If the VM does not respond to the heartbeat check with an echo response, the system determines that the heartbeat check failed. In another example, in response to a disk integrity check, the system expects to receive textual output, that when parsed, indicates that the disk checked out as functioning properly. If the system receives an error from the disk integrity check or it does not complete within a corresponding timeout, the system determines that the disk integrity check failed.

In one embodiment, results may be transmitted by the VM, e.g., via the communication channel, to the command abstraction module within the system. The VM itself may provide partial analysis, full analysis, or no analysis of the results in this embodiment, with the command abstraction module being configured to fully interpret the results.

In one or more embodiments, if a correctable error is detected, feedback 218 is provided to the system to allow the system to adapt the validation check 208 to overcome one or more issues or settings that may be inhibiting execution of the validation check 208, and the validation check 208 is retried based on the adaptive feedback 218. In response to the validation check not finishing normally, in operation 212, it is reported that the validation check failed.

Multiple layers of validation are provided by method 200 in various embodiments. Passive and active validation are provided. Passive validation utilizes static testing schemes that produce one or more of a select group of results that are understood prior to executing the passive validation check. Active validation is more involved than simply running a pre-existing validation check scheme.

Active validation may enable future validation operations to be selected based on execution and results of previous validation operations. In an example, if an initial chkdsk operation failed due to lack of a VSS snapshot, commands may be run to fix and verify proper start of VSS. Thereafter, a new chkdsk operation may be run. In this example, an initial lightweight check of database integrity may be run, and if it fails an additional, more rigorous check may be performed to refine a purpose and/or scope of corruption. In this way, the confidence and accuracy of verification may be achieved by running checks based on types of applications running in the VM.

In one or more embodiments, some validation operations may adapt to conditions and results from running previous validation operations. The scope of these "follow-up" validation operations may include any of the following types of validation operations, along with others not specifically described.

One follow-up validation operation includes a "self-heal" function that attempts to repair backup data of the reference system. When the backup data is determined to be corrupted in some fashion, this corruption may be the result of bugs or glitches in software involved in the execution of the validation operations 204, or from failure of the underlying hardware running such software. In this case, a "healing backup" of the data of the reference system is executed, which may include a deep scan of the reference system data in order to refresh the backup data. This operation may be resource intensive and time consuming, but it guarantees that the backup data is fully synchronized and "healed" from whatever corruption it was experiencing.

As the deep scan is performed, blocks on the reference system may be compared to blocks on the backup storage, and any differences are transmitted allowing corrections to be made to the backup storage. If the reference system does not have any disk corruption itself, this will fix the backup data of the reference system such that the data has integrity and is thus recoverable.

In one or more embodiments, an action designated to address a failure may be intelligent and adaptable. For instance, a chkdsk may be run on the reference system before making a healing backup to ensure that any disk errors are fixed. Thereafter, an alert may be sent to the telemetry system in the case where self-healing is not successful. In another example, one or more OS commands, e.g., system file checker (scansfc), may be automatically triggered to repair OS files, registry files, drivers, etc.

In one or more embodiments, follow-up validation operations may include adaptive integrity checks. In these checks, the software installed on the reference system is automatically detected and a corresponding advanced integrity check specifically tailored for the software combination resident on the reference system is executed to verify the consistency of the application. Such adaptive integrity checks may be used in place of or in combination with a generic integrity check.

In an embodiment, the VM or some other component of the system may automatically detect viruses, malware, malicious code, etc. Such detection mechanisms may include, but are not limited to, executing existing security software already installed on the reference system, analyzing logs of such existing security software, and detection methods contained wholly within the validation operation itself. In response to detection of one of these security threats, the user may be notified. In a further approach, the VM or some other component of the system may determine and verify system and application security settings, and may take actions to update and/or resolve a detected security issue in the application. For example, common security holes may be searched for, and if found, corresponding security updates/patches on the reference system may be downloaded and installed automatically to overcome the detected security issue.

In one or more approaches, a system upgrade, an application update, and/or a security software update may be triggered at boot-up (e.g., Windows updates, Linux OS upgrades, etc.), and such updates may optionally trigger one or more reboots of the validation VM. In such situations, execution of the validation operations 204 may be paused until the update(s) are completed. This may require a subsequent restart, which will further delay the verification operations 204 but ensure that false failure reports are not produced.

In an embodiment, the user may be notified when the reference system is corrupted and the backup data does not heal itself as described above. This helps to get the user involved as early as possible before the reference system is irreparably broken.

In several approaches, the VM or some other component of the system may search for common maintenance problems in the reference system (e.g., Windows registry corruption, logs consuming more than expected amounts of space on a drive, system libraries not being correctly installed, etc.). In response to detecting one or more such maintenance problems, one or more corresponding corrective actions may be executed on the reference system. This corrective action may be performed with or without user authorization, in several approaches.

In an embodiment, the VM or some other component of the system determines whether more validation operations are still available for execution in the defined sequence (Operation 214). If more validation operations are available, then the next validation operation 204 is executed; otherwise, the validation VM indicates that the backup recovery point is validated (Operation 216).

In one or more embodiments, multiple devices within the reference system may have features described in method 200 implemented to validate backup data for the various devices within the reference system. All of the backup data for all devices within the reference system may be stored to a single hardware appliance or multiple hardware appliances. By collecting all of the backup data for multiple devices in the reference system, decisions on how to proceed may be based on the results obtained from one or more of the multiple devices in the reference system, rather than just a single device.

In such an approach, if one device depends on another device (e.g., an MSExchange server may depend on an Active Directory server being up and running), multiple distinct VMs may be started in one or more hardware appliances. These VMs may be used to verify that the whole of the backup data and reference system infrastructure (devices, servers, databases, etc.) works correctly.

In one or more embodiments, the VM may be monitored during its execution of the validation operation sequence, and information may be cached during the start-up of the VM and execution of the validation operations. This information may be used to allow the VM and/or one or more validation operations in the sequence to launch faster in case of a recovery operation being performed. For example, the information may include file system data blocks that are actively used on boot-up of the reference system, and an underlying appliance block-level storage may be caused to cache the corresponding blocks of data for future use.

In one or more embodiments, data and statistics for validation checks across a plurality of reference systems may be collected in a remote telemetry system that is accessible to each of the hardware appliances operating on the plurality of reference systems. Validation and verification metrics from individual validation operations run across all installed appliances may be aggregated into a centralized telemetry database stored to the telemetry system as telemetry data. These aggregated metrics provide a holistic view of validation operation performance across the entire spectrum of installations.

Based on this telemetry data, one or more appliances may be instructed to prioritize and schedule validation operations based on historical trends discovered across different installations. VMs with historically successful validation operations may be scheduled to execute subsequent operations less frequently than VMs with less successful validation operations. In another example, the VMs may be proactively fixed by injecting missing drivers, for example, to the validation VM to allow the VMs to boot correctly when checked and when later needed to restore data for the reference system. In an example, frequently changed blocks on the appliance may be proactively cached to boot the VM more quickly when needed. In one example, an order in which multiple dependent VMs are booted (boot order) may be pre-evaluated so that it automatically virtualizes the entire environment represented by the multiple dependent VMs when needed.

In one embodiment, an Elasticsearch-Logstash-Kibana (ELK) stack may be used for collection and reporting purposes. The telemetry system provides the opportunity to proactively monitor the various reference systems and make common decisions based on the collective data across all reference systems, as well as to allow the individual identification of systems with failures to allow for proactive remediation, e.g., a technical support person contacting the user of the system proactively with the failed validation, etc.

The telemetry system is configured to monitor components of the various installations (e.g., hardware appliances and corresponding reference systems) for errors, issues, and problems. Thus, bugs and glitches in the various software installations may be pro-actively found and fixed before such issues disrupt consistency or integrity of backup data from one or more of the reference systems. In addition, the telemetry system may be configured to use machine learning and adaptive learning technologies to identify patterns across multiple installations relating to verification accuracy, system and/or validation performance, resource usage, etc.

By analyzing statistics and data across multiple reference system installations, the number of "false positive" results reported by one or more reference systems may be reduced or eliminated. A false positive occurs when a validation operation indicates a problem, but the backup data is actually safe and properly backed-up based on the reference system data. In response to an identified issue, a notification may be provided to a user that the reference system is experiencing the issue, when no such issue is actually present. Such a false positive demands or may cause user attention to address the perceived issue, and may actually result in changes that are unnecessary and time consuming.

In one embodiment, clustering of failure causes and/or system commonalities may be observed over a period of time. This clustering may be observed across a variety of installations. Based on these observed clusters of failure causes, one or more new validation checks for popular software services which are causing legitimate failures may be created and executed on installations that may experience such failures.

In an embodiment, based on run statistics collected across a plurality of verification operations of the same type, validation for backup data of one or more reference systems may be improved. Run statistics may include, but are not limited to, which verification check was executed, an amount of time needed to execute the validation check, which reference system the validation check was executed on, conditions of the reference system and/or VM (software, applications installed, drives, etc.). By accumulating run statistics across all installations, timeouts for each of the verification checks may be determined, refined, and set for each installation individually, based on aggregate leanings across all installations. The various timeouts may be based on type of operating system, number of drives, drive size, installed applications, etc.

Based on the accumulated run statistics, a security health score and security procedures for each installation may be scored individually, and recommendations for improving the security health score and security procedures may be provided to the user of a specific reference system based on how other systems are protected and improved operating characteristics of the other reference systems.

In one or more embodiments, adaptivity actions may be generalized based on accumulated run statistics. For instance, statistics about drive usage across a plurality of installations may be collected. This data may be analyzed and certain consistent patterns may be learned from the drive usage, such as a particular set of data being loaded into memory to execute a particular validation operation. To improve functioning of future validation operations of the same type, a block-level cache may be automatically populated with the data set prior to executing the particular validation operation on all new and existing installations.

In another example, if a new virus software is gaining popularity based on statistics collected from the various installations, users of non-conforming installations may be notified of the new virus software in order to prevent infection and improve reference system performance in the face of an ever-changing security landscape.

In more embodiments, accumulated statistics may be used to detect a common pattern leading up to data and/or system corruption on multiple installations. This common pattern is a potential indicator of an issue, such as an unknown malware starting to spread across the various installations. Based on the common pattern, updates to the software of each reference system utilizing packages that are the same as those systems affected by the data and/or system corruption may be devised and implemented. This implementation may require user approval, or may be automatically implemented. Different levels of what kind of changes may be automatically implemented may be selected by the user through an interface. Moreover, based on a common security issue on servers of the reference systems, packages in the telemetry system may be added and/or removed.

In another example, data may be collected from the various installations about what kind of software is installed on the servers of the reference systems. Based on this collected data, new validation checks configured specifically for one or more popular software packages may be created to enhance the performance of the validation sequence when applied to the systems which utilize the popular software packages. In this way, changes to reference system configurations may be anticipated, and patches and/or updates to the validation routines may be created and rolled out to all installations in a timely manner, without requiring any user configuration or support intervention.

Figure 3:
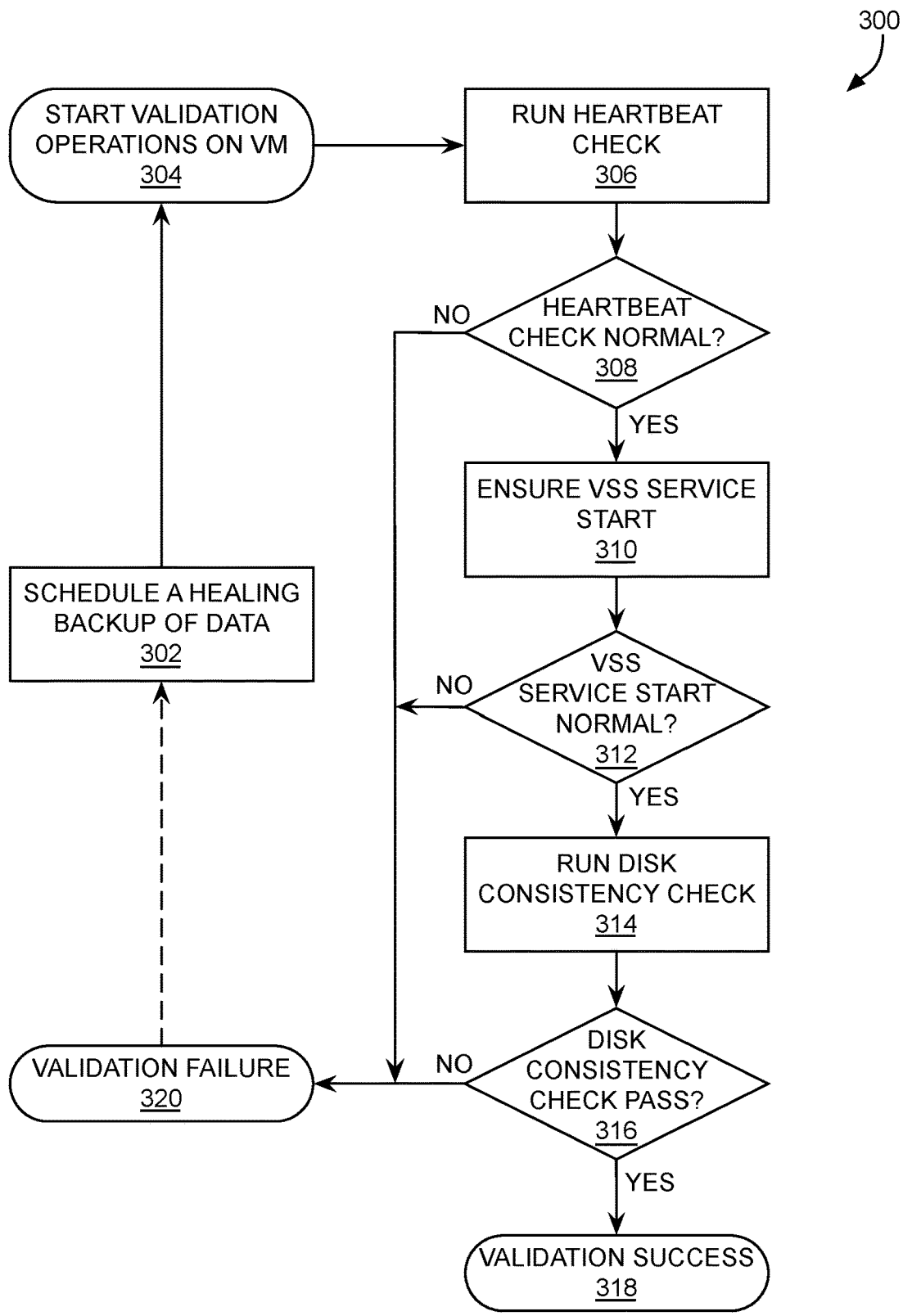
FIG. 3 illustrates a method for validating backup data according to one or more embodiments.

FIG. 3 illustrates a method 300 for validating backup data according to one or more embodiments. One or more operations illustrated in FIG. 3 may be modified, rearranged, or omitted all together. Accordingly, the particular sequence of operations illustrated in FIG. 3 should not be construed as limiting the scope of one or more embodiments. Method 300 provides a foundation for executing a number of validation operations or checks to determine the health of a reference system, backup recovery point, and/or VM.

In one or more embodiments, a system (automatically or in response to user action) schedules the creation of a healing backup for data of a reference system (Operation 302). The healing backup may be initiated immediately, programmed for some time in the future, or set to run periodically according to a schedule, e.g., hourly, daily, weekly, etc. The healing backup may be triggered based on a detectable condition or action. Some example conditions and actions include the failure of a disk integrity check validation operation, change(s) to the reference system, adding or removing components, an amount of time transpiring since a last backup, etc. The schedule for performing the healing backups may be stored to a data repository on the system which executes the healing backup, and/or remotely in a cloud or telemetry system.

In an embodiment, the system boots up a validation VM to verify and validate the backup data of the reference system (Operation 304). The validation VM may be started on a writeable file system mounted on a copy-on-write clone of a backup recovery point, in order to determine the health of the VM and/or the underlying reference system for which a backup recovery point is established. The VM is started using a hypervisor or some other virtualization platform using known techniques.

Method 300 provides a foundation for running a number of different types of validation checks, from basic checks with simple outcomes to much more advanced, application-level validation checks. Some example validation checks include, but are not limited to, a heartbeat check, a VSS check, a disk integrity check, a database integrity check, a mail server integrity check, and a domain controller integrity check.

The validation VM started in Operation 304 is configured to execute a number of different validation operations. The validation operations described in FIG. 3 describe one sequence of validation operations which may be used, but the embodiments described herein are not limited to this specific implementation.

The system executes a heartbeat check to verify that the validation VM started successfully (Operation 306). The system determines whether the heartbeat check executed successfully (Operation 308). If the heartbeat check executed successfully, method 300 continues to Operation 310; otherwise, method 300 jumps to Operation 320.

In response to the heartbeat check executing successfully, the system takes action to ensure that the VSS service started normally on the VM, and if not, to attempt to repair it and then start it normally (Operation 310). Next, after a timeout, the system determines whether the VSS service actually started successfully on the VM (Operation 312). If the VSS service started successfully, method 300 continues to Operation 314; otherwise, method 300 jumps to Operation 320.

In response to the VSS service starting successfully, the system performs a disk consistency check on the VM and/or the reference system (Operation 314). Next, the system determines whether the disk consistency check passed without fault (Operation 316). If the disk consistency check passed without fault, method 300 continues to Operation 318; otherwise, method 300 jumps to Operation 320.

If the system determines that the backup data is valid and that data integrity is intact, then method 300 ends (Operation 318). However, the system may determine that the backup data is invalid and/or data integrity does not exist (Operation 320) as a result of a failed check in any of Operation 308, Operation 312, or Operation 316. Upon request (or automatically in some cases, depending on settings), method 300 will continue to Operation 302 after Operation 320 to perform a healing backup of data of the reference system, as the previously performed backup was not successful and the backup data would not be usable and/or reproduce the conditions of the reference system sufficiently.

To enable a clear understanding of the technological concepts described herein, the particular methods described herein include specific operations, which may be performed in a specific order, or one or more of the operations of a particular method may be rearranged and/or omitted while remaining within the contemplated scope of the technology disclosed herein. Moreover, different methods, and/or operations thereof, may be combined, rearranged, omitted, and/or executed in parallel to create different methods that are also within the contemplated scope of the technology disclosed herein. Additionally, while the methods described herein may omit or briefly summarize some of the details of the technologies disclosed herein for clarity, any details described in any of the paragraphs herein may be combined with the described operations to provide a more comprehensive understanding of these methods and related technologies.

Figure 4:
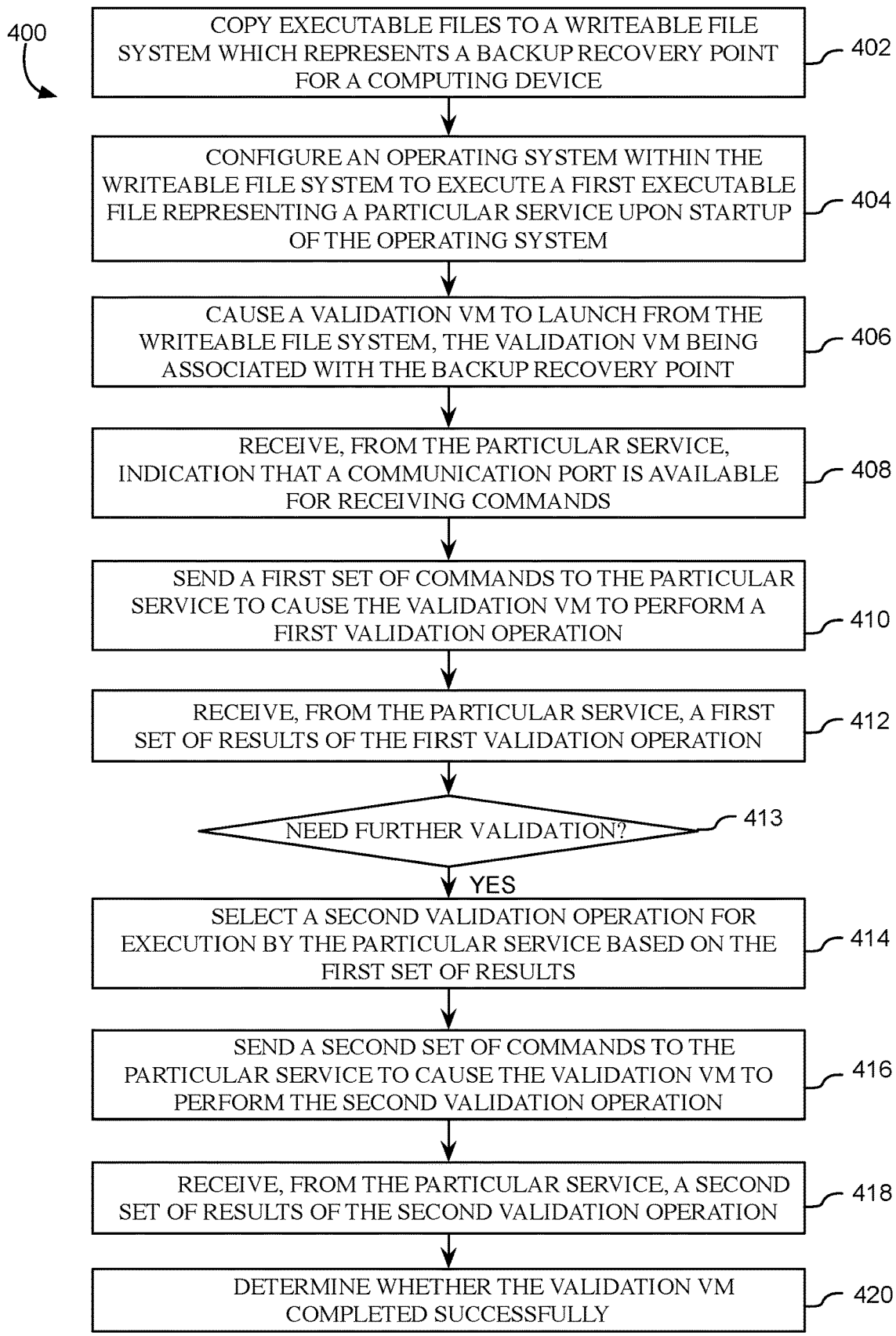
FIG. 4 is flow diagram of an example method for performing validation operations on backup data of a reference system.

FIG. 4 is flow diagram of an example method 400 for performing validation operations on backup data of a reference system. One or more operations illustrated in FIG. 4 may be modified, rearranged, or omitted all together. Accordingly, the particular sequence of operations illustrated in FIG. 4 should not be construed as limiting the scope of one or more embodiments. In one embodiment, method 400 may be executed by a hardware appliance or system configured to create and manage backup data for a reference system.

The system copies executable files to a writeable file system mounted on a copy-on-write clone of a backup recovery point (Operation 402), in one embodiment. In other embodiments, other methods of building a writeable file system may be utilized. The writeable file system represents a backup recovery point for a computing device (e.g., the reference system). The executable files may include a service executable configured to execute upon boot up of a validation VM, in one approach.

According to an embodiment, prior to copying the one or more executable files to the writeable file system, one or more user-provided executable files may be received, e.g., from a user, administrator, developer, a telemetry system, etc. The one or more executable files copied to the writeable file system may include at least one user-provided executable file, and prior to copying the one or more executable files to the writeable file system, the one or more executable files to copy to the writeable file system may be selected based on environmental conditions of the reference system and/or the validation VM.

In one or more embodiments, the system may mount the writeable file system prior to copying the executable file. Further, the system may mount a registry corresponding to the operating system of a device within the reference system prior to configuring the operating system of the reference system. Moreover, the system may unmount the writeable file system and the registry prior to causing the validation VM to launch from the writeable file system.

The system configures an operating system within the writeable file system to cause the operating system to execute a first executable file upon startup of the operating system (Operation 404). This first executable file represents a particular service that is to be started upon startup of the validation VM.

In another embodiment, instead of the operating system being configured as part of the validation sequence described in FIG. 4, the particular service may be installed on the reference system itself prior to performing method 400. In this embodiment, Operations 402 and 404 may be omitted from method 400, as the executable files are already in the data and the operating system of the reference system is already configured to start the particular service upon startup of the validation VM.

After the operating system is configured to start the particular service upon startup of the validation VM, the validation VM is launched. In one embodiment, the system causes the validation VM to launch from the writeable file system, such as via a hypervisor or some other virtualization platform (Operation 406).

The system receives indication that a communication port is available (Operation 408). The communication port is configured for receiving commands, and the indication is received from the particular service after startup of the validation VM. In one approach, the communication port may be established via the QEMU serial interface exposed in Windows as a COM-port. In one embodiment, a hypervisor is configured to include a virtual serial interface which is included in the definition of the VM upon launch. When the VM is started, the virtual serial interface can be used to transmit data. However, commands sent to the virtual serial interface will not be acted upon until the particular service has started and begins to listen for such commands on the COM-port associated with the QEMU serial interface.

The system sends a first set of commands to the particular service, e.g., via the communication port, to cause the validation VM to perform a first validation operation (Operation 410). Additional validation operations may be performed in addition to the first validation operation, as discussed in more detail previously.

In one approach, the first validation operation may detect a current validation VM configuration and/or applications operating on the validation VM and/or the reference system. From this information provided in the first set of results selects, one or more additional validation operations are selected that are based on the current validation VM configuration.

According to a particular implementation, the sequence of validation operations, their order of execution, or variables that affect validation checks and results may be adjusted in response to changes detected in the validation VM runtime state. Changes detected in the validation VM runtime state may include, but are not limited to, time since a last reboot, a number of reboots, virtual CPU (vCPU) and virtual RAM (vRAM) utilization, I/O port activity, transfer rates of virtual storage interfaces, and operation rates of virtual storage interfaces.

In one embodiment, in response to detecting that the validation VM has been rebooted, the current validation operation will be cancelled and a new sequence of validation operations will be scheduled. This new sequence of validation operations may repeat any validation operations executed thus far, but with associated timeouts adjusted to be lengthened to accommodate additional run time. Then, the new sequence of validation operations may continue on with the current schedule of validation operations that were not yet executed.

In another embodiment, during execution of an extended SQL database integrity validation operation, if it is detected that more than a certain limit (e.g., about 50 GB) of data has been transferred through the virtual storage interface of the validation VM, then the current validation operation is canceled and execution continues with a "metadata-only" SQL database integrity check operation instead. Thereafter, the validation sequence continues with the previously scheduled validation operations.

The system receives, from the particular service, a first set of results of the first validation operation (Operation 412), e.g., via the communication port. The first set of results are received after execution of the first validation operation, and may include indication of success or failure, along with system details related to the validation operation.

According to one embodiment, another validation operation may be started prior to completion of the first validation operation. Moreover, this additional validation operation may be based, at least in part, on partial results of the first validation operation.

In one embodiment, the first set of results may include environmental conditions. The environmental conditions may include, but are not limited to, any of the following: available resources on the reference system and/or the appliance that includes the writeable file system, historical data collected from prior validation operations, applications currently executing on the reference system, security conditions and settings of the reference system and/or the appliance, known vulnerabilities and detected threats to the reference system and/or the appliance, a timing and/or a number of reboots of an operating system of the validation VM, and historical activity related to backing up data of the reference system.

The environmental conditions may include any information useful in determining characteristics of the reference system as they existed when the backup data was created. Examples of environmental conditions include telemetry data, missing or unapplied security patches and/or updates, identified malware based on a signature, file access patterns indicating the likely presence of nefarious software like ransomware, etc.

The system determines whether further validation operations are required to determine the validity of the backup data and/or confirm consistency of the backup recovery point (Operation 413). If the system determines that no further validation operations are needed, method 400 ends. Otherwise, method 400 continues to Operation 414.

The system selects a second validation operation for execution by the particular service based on the first set of results (Operation 414). This second validation operation may be used to confirm results of the first validation operation, to determine a source of error related to the first validation operation, check operation of a different aspect of the reference system, etc. The desired function to be performed dictates the second validation operation that is selected. The selection of the second validation operation is based on the results from the first validation operation in one approach.

In various embodiments, the first and/or second validation operation may be any type of validation operation described herein, set up by a user, or known in the art, including, but not limited to, a user-provided executable file, a heartbeat check, a VSS check, a disk integrity check, a database integrity check, a mail server integrity check, and a domain controller integrity check.

In one approach, the second validation operation may be selected based on results obtained from executing a user-provided executable file. This may include running the user-provided executable file (script) as a check. Moreover, the user-defined script may be configured to first check to see if the user-defined script is applicable on the particular appliance and/or reference system and associated configurations thereof. As a result of this check, a validation operation associated with the user-defined script may be skipped unless certain further conditions are met.

The system sends a second set of commands to the particular service, e.g., via the communication port, to cause the validation VM to perform the second validation operation (Operation 416). In one approach, the first and/or second set of commands may be executed on a command line interface of the validation VM.

The system receives, from the particular service, a second set of results of the second validation operation (Operation 418). The second set of results are received after execution of the second validation operation, and may be received via the communication port.

In one embodiment, results of prior validation operations may be analyzed to reduce a number of false positive results obtained from the first and second validation operations. This analysis may be enhanced by using machine learning models and/or cloud telemetry data to further refine the anticipated results from the first and/or second validation operations performed in method 400.

The system determines whether the validation VM completed successfully (Operation 420). This determination is based on the second set of results, alone or in conjunction with the first set of results and/or additional results of more validation operations.

In one approach, the validation VM is configured to confirm consistency of the backup recovery point, and completes successfully based on the first set of results and the second set of results showing successful completion of the first validation operation and the second validation operation, respectively.

According to an approach, method 400 may include the following operations prior to determining whether the validation VM completed successfully. In a first operation, a repair operation to repair the operating system of the computing device and/or backup data of the reference system stored to the writeable file system may be determined based on the first set of results. In a second operation, the repair operation may be performed to repair the operating system of the computing device and/or the backup data of the reference system stored to the writeable file system. In a third operation, the repair operation is determined to either complete successfully or to have failed.

In an embodiment, method 400 may include monitoring progress of the validation VM using an overall timeout function. In one embodiment, the length of the overall timeout function may be set based on accumulated data from the validation of other reference systems across one or more additional appliances. In another embodiment, the length of the overall timeout function may be set based on the various validation operations that will be executed, e.g., a cumulative timeout based on the length of the individual timeouts for each of the validation operations.

In an embodiment, progress of the first and second validation operations may be monitored using first and second timeout functions, respectively. In this embodiment, a length of the first timeout function may be configured specifically for the first validation operation, and a length of the second timeout function may be configured specifically for the second validation operation. Moreover, in a further approach, a length of the second timeout function may be partially based on the first validation operation.

According to one embodiment, method 400 may include adjusting the overall timeout function based on operating conditions of a host computing device (e.g., the hardware appliance) that includes the writeable file system. Moreover, the overall timeout function may be based on operating conditions of the validation VM.

In this embodiment, the first and second timeout functions may be adjusted, individually, based on requirements of the first and second validation operations, respectively. The requirements may include, but are not limited to, a waiting period for returning a result from a validation check, use of available resources of the appliance, feedback or input from one or more other processes executing on the VM and/or the appliance, etc.

In one embodiment, method 400 may include adjusting the first and second timeout functions, individually, based on operating conditions of the host computing device (e.g., the hardware appliance) that includes the writeable file system. Moreover, the first and second timeout functions may be adjusted, individually, based on operating conditions of the validation VM.

According to one embodiment, the first and second timeout functions may be adjusted, individually, based on analysis of historical data collected from prior validation operations. This historical data may be collected from the appliance that is performing the present validation operations, and/or may be obtained from validation operations performed by multiple computing devices (e.g., other appliances) and/or on multiple reference systems.

In one or more embodiments, the communication port for the particular service is established during launch of the validation VM. Moreover, the communication port may be used to obtain the first set of results of the first validation operation from a hypervisor (or other virtualization layer or platform) operating on the appliance device that manages the writeable file system.

3. Miscellaneous; Extensions

Embodiments are directed to a system with one or more devices that include a hardware processor and that are configured to perform any of the operations described herein and/or recited in any of the claims below. In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

4. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
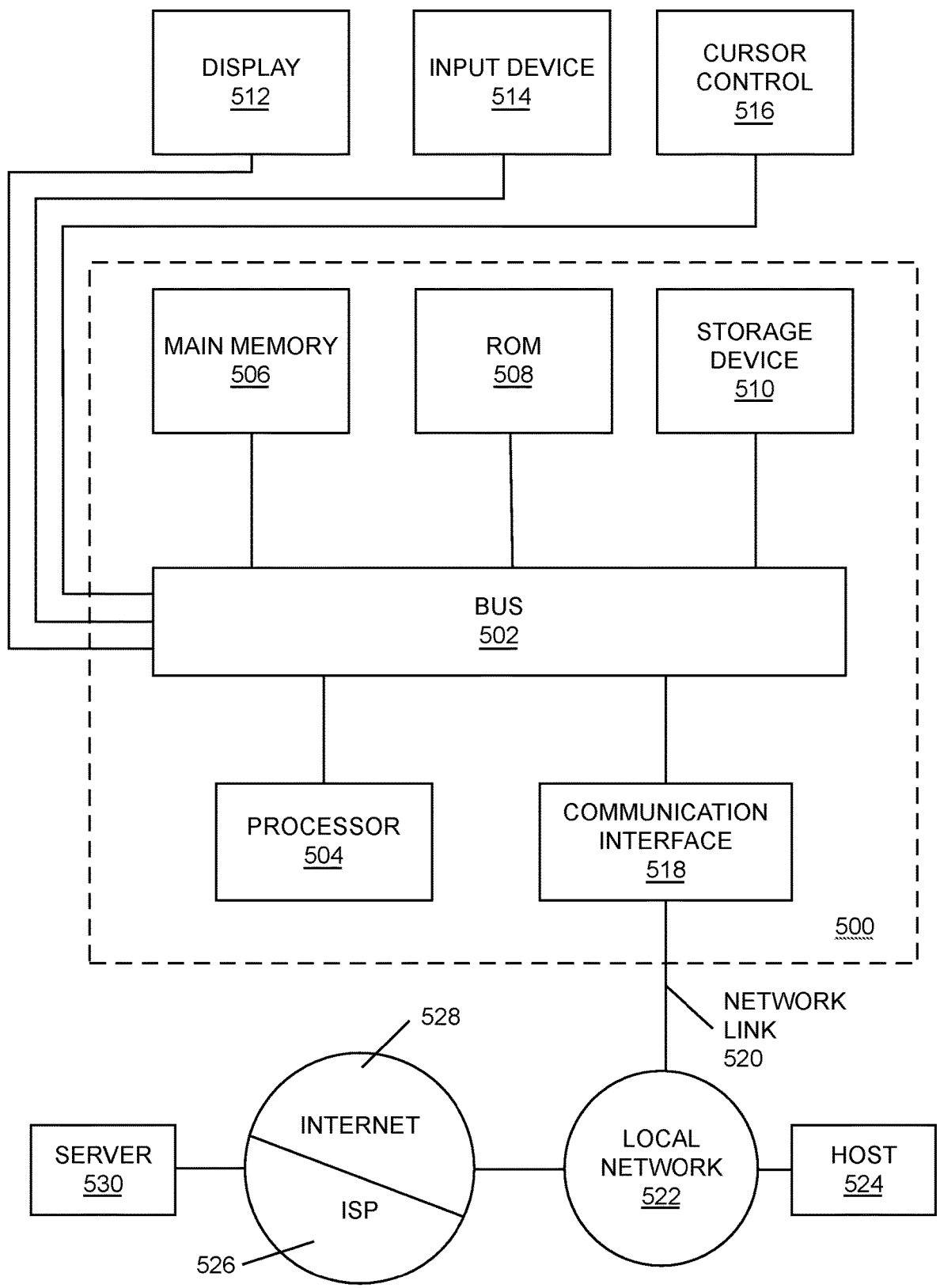
FIG. 5 shows a block diagram of an example computing system that may implement the features and processes of FIGS. 1-4.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or solid state disk, is provided and coupled to bus 502 for storing information and instructions.

Computer system 500 may be coupled via bus 502 to a display 512, such as a liquid crystal display (LCD), plasma display, electronic ink display, cathode ray tube (CRT) monitor, or any other kind of device for displaying information to a computer user. An input device 514, including alphanumeric and other keys, may be coupled to bus 502 for communicating information and command selections to processor 504. Alternatively or in addition, the computer system 500 may receive user input via a cursor control 516, such as a mouse, a trackball, a trackpad, a touchscreen, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. The display 512 may be configured to receive user input via one or more pressure-sensitive sensors, multi-touch sensors, and/or gesture sensors. Alternatively or in addition, the computer system 500 may receive user input via a microphone, video camera, and/or some other kind of user input device (not shown).

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, solid-state or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media.

For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 500 can receive the data from the network and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

5. Computer Networks and Cloud Networks

In one or more embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

Variations of the disclosed embodiments are also possible, and the explicit description thereof in this document is not required in order to provide a person having ordinary skill in the art with the ability to conceive of such variations when reading the present descriptions.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
   copying one or more executable files to a writeable file system which represents a backup recovery point for a computing device;
   configuring an operating system within the writeable file system to execute a first executable file of the one or more executable files upon startup of the operating system, the first executable file representing a particular service;
   causing a validation virtual machine (VM) to launch from the writeable file system, the validation VM being associated with the backup recovery point;
   receiving, from the particular service, indication that a communication port is available for receiving commands;
   sending a first set of one or more commands to the particular service via the communication port to cause the validation VM to perform at least a first validation operation;
   receiving, from the particular service, a first set of results of the first validation operation;
   analyzing results of prior validation operations to reduce a number of false positive results in the first set of results obtained from the first validation operation;
   based on the first set of results, selecting a second validation operation for execution by the particular service;
   sending a second set of one or more commands to the particular service via the communication port to cause the validation VM to perform the second validation operation;
   receiving, from the particular service, a second set of results of the second validation operation;
   analyzing the results of prior validation operations to reduce a number of false positive results in the second set of results obtained from the second validation operation; and
   determining whether the validation VM completed successfully based at least on the second set of results,
   wherein the method is executed by at least one device comprising a hardware processor.

2. The method as recited in claim 1, further comprising:
   monitoring progress of the validation VM using an overall timeout function; and
   monitoring progress of the first and second validation operations using first and second timeout functions, respectively,
   wherein a length of the first timeout function is configured specifically for the first validation operation, and
   wherein a length of the second timeout function is configured specifically for the second validation operation.

3. The method as recited in claim 1, further comprising:
   establishing the communication port for the particular service, the communication port being established during launch of the validation VM,
   wherein the communication port is used to obtain the first set of results of the first validation operation from a hypervisor operating on a host computing device comprising the writeable file system.

4. The method as recited in claim 1, wherein the validation VM is configured to confirm consistency of the backup recovery point, and wherein the validation VM is determined to have completed successfully based on the first set of results and the second set of results showing successful completion of the first validation operation and the second validation operation, respectively.

5. The method as recited in claim 1, wherein the second validation operation is selected from a group of operations comprising: a user-provided executable file, a heartbeat check, a volume shadow copy service (VSS) check, a disk integrity check, a database integrity check, a mail server integrity check, and a domain controller integrity check.

6. The method as recited in claim 5, further comprising selecting the second validation operation based on results obtained from executing the user-provided executable file.

7. The method as recited in claim 1, wherein the first set of results comprises environmental conditions selected from a group comprising: available resources on the computing device and/or a host computing device comprising the writeable file system, historical data collected from prior validation operations, applications currently executing on the computing device, security conditions and settings of the computing device and/or the host computing device, known vulnerabilities and detected threats to the computing device and/or the host computing device, a timing and/or a number of reboots of an operating system of the validation VM, and historical activity related to backing up data of the computing device.

8. The method as recited in claim 1, further comprising, prior to copying the one or more executable files to the writeable file system, receiving one or more user-provided executable files from a user, wherein the one or more executable files copied to the writeable file system include at least one user-provided executable file.

9. The method as recited in claim 1, further comprising:
   mounting the writeable file system prior to copying the executable file;
   mounting a registry of the computing device prior to configuring the operating system of the computing device; and
   unmounting the writeable file system and the registry prior to causing the validation VM to launch from the writeable file system.

10. A non-transitory computer-readable medium including instructions that, when executed by one or more processors, causes the one or more processors to perform operations comprising:
    copying one or more executable files to a writeable file system which represents a backup recovery point for a computing device;
    configuring an operating system within the writeable file system to execute a first executable file of the one or more executable files upon startup of the operating system, the first executable file representing a particular service;
    causing a validation virtual machine (VM) to launch from the writeable file system, the validation VM being associated with the backup recovery point;
    receiving, from the particular service, indication that a communication port is available for receiving commands;
    sending a first set of one or more commands to the particular service via the communication port to cause the validation VM to perform at least a first validation operation;
    receiving, from the particular service, a first set of results of the first validation operation;
    analyzing results of prior validation operations to reduce a number of false positive results in the first set of results obtained from the first validation operation;
    based on the first set of results, selecting a second validation operation for execution by the particular service;

sending a second set of one or more commands to the particular service via the communication port to cause the validation VM to perform the second validation operation;
receiving, from the particular service, a second set of results of the second validation operation;
analyzing the results of prior validation operations to reduce a number of false positive results in the second set of results obtained from the second validation operation; and
determining whether the validation VM completed successfully based at least on the second set of results.

11. The non-transitory computer-readable medium as recited in claim 10, wherein the operations further comprise:
monitoring progress of the validation VM using an overall timeout function; and
monitoring progress of the first and second validation operations using first and second timeout functions, respectively,
wherein a length of the first timeout function is configured specifically for the first validation operation, and
wherein a length of the second timeout function is configured specifically for the second validation operation.

12. The non-transitory computer-readable medium as recited in claim 11, wherein the operations further comprise:
adjusting the overall timeout function based on operating conditions of (a) a host computing device comprising the writeable file system, and (b) the validation VM; and
adjusting the first and second timeout functions, individually, based on requirements of the first and second validation operations, respectively.

13. A system comprising:
one or more processors; and
a non-transitory computer-readable medium including instructions that, when executed by the one or more processors, causes the one or more processors to perform operations comprising:
copying one or more executable files to a writeable file system which represents a backup recovery point for a computing device;
configuring an operating system within the writeable file system to execute a first executable file of the one or more executable files upon startup of the operating system, the first executable file representing a particular service;
causing a validation virtual machine (VM) to launch from the writeable file system, the validation VM being associated with the backup recovery point;
receiving, from the particular service, indication that a communication port is available for receiving commands;
sending a first set of one or more commands to the particular service via the communication port to cause the validation VM to perform at least a first validation operation;
receiving, from the particular service, a first set of results of the first validation operation;
analyzing results of prior validation operations to reduce a number of false positive results in the first set of results obtained from the first validation operation;
based on the first set of results, selecting a second validation operation for execution by the particular service;
sending a second set of one or more commands to the particular service via the communication port to cause the validation VM to perform the second validation operation;
receiving, from the particular service, a second set of results of the second validation operation;
analyzing the results of prior validation operations to reduce a number of false positive results in the second set of results obtained from the second validation operation; and
determining whether the validation VM completed successfully based at least on the second set of results.

14. The system as recited in claim 13, wherein the operations further comprise:
monitoring progress of the validation VM using an overall timeout function; and
monitoring progress of the first and second validation operations using first and second timeout functions, respectively,
wherein a length of the first timeout function is configured specifically for the first validation operation, and
wherein a length of the second timeout function is configured specifically for the second validation operation.

15. The system as recited in claim 14, wherein the operations further comprise:
adjusting the overall timeout function based on operating conditions of (a) a host computing device comprising the writeable file system, and (b) the validation VM; and
adjusting the first and second timeout functions, individually, based on requirements of the first and second validation operations, respectively.

16. A non-transitory computer-readable medium including instructions that, when executed by one or more processors, causes the one or more processors to perform operations comprising:
copying one or more executable files to a writeable file system which represents a backup recovery point for a computing device;
configuring an operating system within the writeable file system to execute a first executable file of the one or more executable files upon startup of the operating system, the first executable file representing a particular service;
causing a validation virtual machine (VM) to launch from the writeable file system, the validation VM being associated with the backup recovery point;
monitoring progress of the validation VM using an overall timeout function;
adjusting the overall timeout function based on operating conditions of (a) a host computing device comprising the writeable file system, and (b) the validation VM;
receiving, from the particular service, indication that a communication port is available for receiving commands;
sending a first set of one or more commands to the particular service via the communication port to cause the validation VM to perform at least a first validation operation;
monitoring progress of the first validation operation using a first timeout function, wherein a length of the first timeout function is configured specifically for the first validation operation;
adjusting the first timeout function based on requirements of the first validation operation;

receiving, from the particular service, a first set of results of the first validation operation;
based on the first set of results, selecting a second validation operation for execution by the particular service;
sending a second set of one or more commands to the particular service via the communication port to cause the validation VM to perform the second validation operation;
monitoring progress of the second validation operation using a second timeout function, wherein a length of the second timeout function is configured specifically for the second validation operation;
adjusting the second timeout function based on requirements of the second validation operation;
receiving, from the particular service, a second set of results of the second validation operation; and
determining whether the validation VM completed successfully based at least on the second set of results.

17. A non-transitory computer-readable medium including instructions that, when executed by one or more processors, causes the one or more processors to perform operations comprising:
copying one or more executable files to a writeable file system which represents a backup recovery point for a computing device;
configuring an operating system within the writeable file system to execute a first executable file of the one or more executable files upon startup of the operating system, the first executable file representing a particular service;
causing a validation virtual machine (VM) to launch from the writeable file system, the validation VM being associated with the backup recovery point;
monitoring progress of the validation VM using an overall timeout function;
receiving, from the particular service, indication that a communication port is available for receiving commands;
sending a first set of one or more commands to the particular service via the communication port to cause the validation VM to perform at least a first validation operation;
monitoring progress of the first validation operation using a first timeout function, wherein a length of the first timeout function is configured specifically for the first validation operation;
adjusting the first timeout function based on analysis of historical data collected from prior validation operations;
receiving, from the particular service, a first set of results of the first validation operation;
based on the first set of results, selecting a second validation operation for execution by the particular service;
sending a second set of one or more commands to the particular service via the communication port to cause the validation VM to perform the second validation operation;
monitoring progress of the second validation operation using a second timeout function, wherein a length of the second timeout function is configured specifically for the second validation operation;
adjusting the second timeout function based on analysis of the historical data collected from the prior validation operations;
receiving, from the particular service, a second set of results of the second validation operation; and
determining whether the validation VM completed successfully based at least on the second set of results.

18. A non-transitory computer-readable medium including instructions that, when executed by one or more processors, causes the one or more processors to perform operations comprising:
copying one or more executable files to a writeable file system which represents a backup recovery point for a computing device;
configuring an operating system within the writeable file system to execute a first executable file of the one or more executable files upon startup of the operating system, the first executable file representing a particular service;
causing a validation virtual machine (VM) to launch from the writeable file system, the validation VM being associated with the backup recovery point;
receiving, from the particular service, indication that a communication port is available for receiving commands;
sending a first set of one or more commands to the particular service via the communication port to cause the validation VM to perform at least a first validation operation;
receiving, from the particular service, a first set of results of the first validation operation;
determining, based on the first set of results, a repair operation to repair one or more of: a) the operating system of the computing device, and b) backup data of the computing device stored to the writeable file system;
performing the repair operation to repair the one or more of a) the operating system of the computing device, and b) the backup data of the computing device stored to the writeable file system;
determining whether the repair operation completed successfully;
based on the first set of results and a determination that the repair operation completed successfully, selecting a second validation operation for execution by the particular service;
sending a second set of one or more commands to the particular service via the communication port to cause the validation VM to perform the second validation operation;
receiving, from the particular service, a second set of results of the second validation operation; and
determining whether the validation VM completed successfully based at least on the second set of results.

19. A non-transitory computer-readable medium including instructions that, when executed by one or more processors, causes the one or more processors to perform operations comprising:
selecting one or more executable files to copy to a writeable file system based on environmental conditions of one or more of: a) a computing device represented by the writeable file system, and b) a validation virtual machine (VM);
copying the one or more executable files to the writeable file system which represents a backup recovery point for the computing device;
configuring an operating system within the writeable file system to execute a first executable file of the one or more executable files upon startup of the operating system, the first executable file representing a particular service;
causing the validation VM to launch from the writeable file system, the validation VM being associated with the backup recovery point;
receiving, from the particular service, indication that a communication port is available for receiving commands;
sending a first set of one or more commands to the particular service via the communication port to cause the validation VM to perform at least a first validation operation;
receiving, from the particular service, a first set of results of the first validation operation;
based on the first set of results, selecting a second validation operation for execution by the particular service;
sending a second set of one or more commands to the particular service via the communication port to cause the validation VM to perform the second validation operation;
receiving, from the particular service, a second set of results of the second validation operation; and
determining whether the validation VM completed successfully based at least on the second set of results.

20. A non-transitory computer-readable medium including instructions that, when executed by one or more processors, causes the one or more processors to perform operations comprising:
mounting a writeable file system;
subsequent to mounting the writeable file system, copying one or more executable files to the writeable file system which represents a backup recovery point for a computing device;
mounting a registry of the computing device;
subsequent to mounting the registry of the computing device, configuring an operating system within the writeable file system to execute a first executable file of the one or more executable files upon startup of the operating system, the first executable file representing a particular service;
unmounting the writeable file system and the registry;
subsequent to unmounting the writeable file system and the registry, causing a validation virtual machine (VM) to launch from the writeable file system, the validation VM being associated with the backup recovery point;
receiving, from the particular service, indication that a communication port is available for receiving commands;
sending a first set of one or more commands to the particular service via the communication port to cause the validation VM to perform at least a first validation operation;
receiving, from the particular service, a first set of results of the first validation operation;
based on the first set of results, selecting a second validation operation for execution by the particular service;
sending a second set of one or more commands to the particular service via the communication port to cause the validation VM to perform the second validation operation;
receiving, from the particular service, a second set of results of the second validation operation; and
determining whether the validation VM completed successfully based at least on the second set of results.

21. A method, comprising:
copying one or more executable files to a writeable file system which represents a backup recovery point for a computing device;
configuring an operating system within the writeable file system to execute a first executable file of the one or more executable files upon startup of the operating system, the first executable file representing a particular service;
causing a validation virtual machine (VM) to launch from the writeable file system, the validation VM being associated with the backup recovery point;
monitoring progress of the validation VM using an overall timeout function;
adjusting the overall timeout function based on operating conditions of (a) a host computing device comprising the writeable file system, and (b) the validation VM;
receiving, from the particular service, indication that a communication port is available for receiving commands;
sending a first set of one or more commands to the particular service via the communication port to cause the validation VM to perform at least a first validation operation;
monitoring progress of the first validation operation using a first timeout function, wherein a length of the first timeout function is configured specifically for the first validation operation;
adjusting the first timeout function based on requirements of the first validation operation;
receiving, from the particular service, a first set of results of the first validation operation;
based on the first set of results, selecting a second validation operation for execution by the particular service;
sending a second set of one or more commands to the particular service via the communication port to cause the validation VM to perform the second validation operation;
monitoring progress of the second validation operation using a second timeout function, wherein a length of the second timeout function is configured specifically for the second validation operation;
adjusting the second timeout function based on requirements of the second validation operation;
receiving, from the particular service, a second set of results of the second validation operation; and
determining whether the validation VM completed successfully based at least on the second set of results,
wherein the method is executed by at least one device comprising a hardware processor.

22. A method, comprising:
copying one or more executable files to a writeable file system which represents a backup recovery point for a computing device;
configuring an operating system within the writeable file system to execute a first executable file of the one or more executable files upon startup of the operating system, the first executable file representing a particular service;
causing a validation virtual machine (VM) to launch from the writeable file system, the validation VM being associated with the backup recovery point;
monitoring progress of the validation VM using an overall timeout function;

receiving, from the particular service, indication that a communication port is available for receiving commands;
sending a first set of one or more commands to the particular service via the communication port to cause the validation VM to perform at least a first validation operation;
monitoring progress of the first validation operation using a first timeout function, wherein a length of the first timeout function is configured specifically for the first validation operation;
adjusting the first timeout function based on analysis of historical data collected from prior validation operations;
receiving, from the particular service, a first set of results of the first validation operation;
based on the first set of results, selecting a second validation operation for execution by the particular service;
sending a second set of one or more commands to the particular service via the communication port to cause the validation VM to perform the second validation operation;
monitoring progress of the second validation operation using a second timeout function, wherein a length of the second timeout function is configured specifically for the second validation operation;
adjusting the second timeout function based on analysis of the historical data collected from the prior validation operations;
receiving, from the particular service, a second set of results of the second validation operation; and
determining whether the validation VM completed successfully based at least on the second set of results,
wherein the method is executed by at least one device comprising a hardware processor.

23. A method, comprising:
copying one or more executable files to a writeable file system which represents a backup recovery point for a computing device;
configuring an operating system within the writeable file system to execute a first executable file of the one or more executable files upon startup of the operating system, the first executable file representing a particular service;
causing a validation virtual machine (VM) to launch from the writeable file system, the validation VM being associated with the backup recovery point;
receiving from the particular service, indication that a communication port is available for receiving commands;
sending a first set of one or more commands to the particular service via the communication port to cause the validation VM to perform at least a first validation operation;
receiving, from the particular service, a first set of results of the first validation operation;
determining, based on the first set of results, a repair operation to repair one or more of: a) the operating system of the computing device, and b) backup data of the computing device stored to the writeable file system;
performing the repair operation to repair the one or more of a) the operating system of the computing device, and b) the backup data of the computing device stored to the writeable file system;
determining whether the repair operation completed successfully;
based on the first set of results and a determination that the repair operation completed successfully, selecting a second validation operation for execution by the particular service;
sending a second set of one or more commands to the particular service via the communication port to cause the validation VM to perform the second validation operation;
receiving, from the particular service, a second set of results of the second validation operation; and
determining whether the validation VM completed successfully based at least one the second set of results,
wherein the method is executed by at least one device comprising a hardware processor.

24. A method, comprising:
selecting one or more executable files to copy to a writeable file system based on environmental conditions of one or more of: a) a computing device represented by the writeable file system, and b) a validation virtual machine (VM);
copying the one or more executable files to the writeable file system which represents a backup recovery point for the computing device;
configuring an operating system within the writeable file system to execute a first executable file of the one or more executable files upon startup of the operating system, the first executable file representing a particular service;
causing the validation VM to launch from the writeable file system, the validation VM being associated with the backup recovery point;
receiving, from the particular service, indication that a communication port is available for receiving commands;
sending a first set of one or more commands to the particular service via the communication port to cause the validation VM to perform at least a first validation operation;
receiving, from the particular service, a first set of results of the first validation operation;
based on the first set of results, selecting a second validation operation for execution by the particular service;
sending a second set of one or more commands to the particular service via the communication port to cause the validation VM to perform the second validation operation;
receiving, from the particular service, a second set of results of the second validation operation; and
determining whether the validation VM completed successfully based at least on the second set of results,
wherein the method is executed by at least one device comprising a hardware processor.

25. A method, comprising:
mounting a writeable file system;
subsequent to mounting the writeable file system, copying one or more executable files to the writeable file system which represents a backup recovery point for a computing device;
mounting a registry of the computing device;
subsequent to mounting the registry of the computing device, configuring an operating system within the writeable file system to execute a first executable file of the one or more executable files upon startup of the operating system, the first executable file representing a particular service;

unmounting the writeable file system and the registry;

subsequent to unmounting the writeable file system and the registry, causing a validation virtual machine (VM) to launch from the writeable file system, the validation VM being associated with the backup recovery point;

receiving, from the particular service, indication that a communication port is available for receiving commands;

sending a first set of one or more commands to the particular service via the communication port to cause the validation VM to perform at least a first validation operation;

receiving, from the particular service, a first set of results of the first validation operation;

based on the first set of results, selecting a second validation operation for execution by the particular service;

sending a second set of one or more commands to the particular service via the communication port to cause the validation VM to perform the second validation operation;

receiving, from the particular service, a second set of results of the second validation operation; and determining whether the validation VM completed successfully based at least on the second set of results, wherein the method is executed by at least one device comprising a hardware processor.

* * * * *